Mar. 3, 1925.
M. LATOUR
STATOR FOR ELECTRICAL TOYS
Filed June 1, 1922
1,528,336
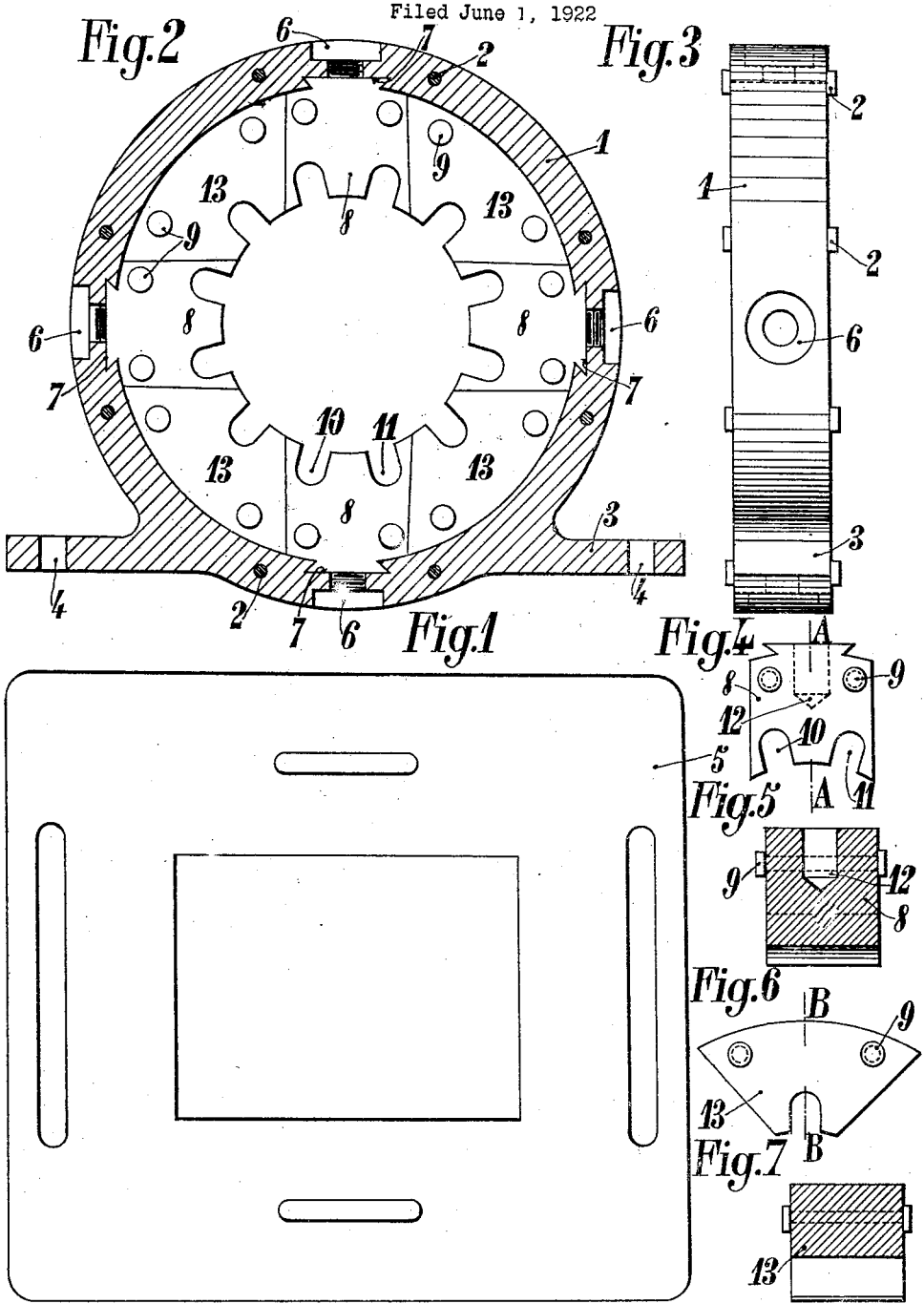
Inventor
M. Latour
By Marks & Clerk
Attys.

Patented Mar. 3, 1925.

1,528,336

UNITED STATES PATENT OFFICE.

MAURICE LATOUR, OF SENS, FRANCE.

STATOR FOR ELECTRICAL TOYS.

Application filed June 1, 1922. Serial No. 565,245.

*To all whom it may concern:*

Be it known that I, MAURICE LATOUR, a citizen of the French Republic, residing at 36 Rue de l'Ile d'Yonne, Sens, Yonne, France, have invented new and useful Improvements in Stators for Electrical Toys, of which the following is the specification.

The present invention relates to a stator for electrical toys, and the invention permits the production of machines having projecting or notched field poles, the number of these poles being variable. The stator in accordance with the invention comprises a tubular body having a substantially cylindrical bore, in which are internally secured pole-pieces of rectangular cross-section. The inner ends of the pole pieces are provided with radial grooves. Other pole pieces are arranged between the first mentioned pole pieces and are of substantially dove-tail form with radial grooves at their inner ends.

The accompanying drawing illustrates, by way of example, a form of construction of the invention.

Fig. 1 is a plan view of a support.

Fig. 2 is an elevation, in longitudinal section, of the stator.

Fig. 3 is a side view of the stator.

Fig. 4 is an elevation of a pole piece.

Fig. 5 is a sectional side view of the same taken on line A—A of Fig. 4.

Fig. 6 is an elevation of another pole-piece.

Fig. 7 is a sectional side view of the same taken on line B—B of Fig. 6.

The frame of the stator is constituted by a ring 1 preferably composed of laminated sheet-iron rings connected by rivets or bolts 2. It is provided with lugs 3 having holes 4 to receive the bolts employed in securing the same to a support 5. The frame 5 is provided with slots permitting the adjustment of the position of the stator and the shaft of the rotor. The frame of the stator is provided with four holes 6, the axes of which are diameters at right angles to each other. This frame is moreover internally recessed to form four dove-tail grooves 7, which serve for fitting up the pole pieces 8. The latter, also preferably made of thin sheet-iron plates connected by rivets or bolts 9, are provided with two notches 10 and 11 (Fig. 4) and with dove-tail lug so as to fit in the grooves 7 of the stator. These pole pieces are moreover each provided with a screw threaded hole 12, so that they can be secured by screws to the frame of the stator. Between the pole pieces 8 may be arranged auxiliary pole pieces 13, the side faces of which are at right angles and are of dove-tail shape so that they are secured simply by being inserted between the pole pieces 8. They are each provided with a notch having a width equal to that of the notches 10 and 11.

It may be readily seen that when use is made of two opposing pole-pieces 8, or of four pole-pieces 8, a stator having two or four projecting poles may be obtained. If all the pole pieces 8 and 13 are used, a stator having notched poles can be obtained. It is to be understood that any number of pole pieces 8 may be employed, provided it is an even number.

What I claim as my invention and desire to secure by Letters-Patent is:

1. In a stator for electrical toys, a tubular body having a substantially cylindrical bore, pole pieces of rectangular cross section arranged in said bore and having radial grooves at their inner ends, means for fixing said pole pieces within said bore, and other pole pieces of substantially dove tail form arranged between the first mentioned pole pieces and having radial grooves in their inner ends.

2. In a stator for electrical toys, a tubular body having a cylindrical bore provided with uniformly spaced mortises, pole pieces of rectangular cross section provided at their outer ends with tenons engaging said mortises and provided at their inner ends with radial grooves, screws connecting these pole pieces to said tubular body, and other pole pieces of substantially dove-tail form fitted between the first mentioned pole pieces and having radial grooves at their inner ends.

3. In a stator for electrical toys, a tubular body having a bore, pole pieces arranged in said bore and having grooves at their inner ends, means detachably connecting the outer ends of said pole pieces to said body, and substantially dove-tailed pole pieces fitted between and spacing the first mentioned pole pieces from one another, said dove-tailed pole pieces being provided with grooves at their inner ends.

Signed at Paris, France, this 20th day of May A. D. 1922.

MAURICE LATOUR.